US011016113B2

(12) United States Patent
Liverato et al.

(10) Patent No.: US 11,016,113 B2
(45) Date of Patent: May 25, 2021

(54) SENSOR BEARING UNIT, ASSEMBLY METHOD OF SAID UNIT AND METHOD FOR ASSEMBLING SAID SENSOR BEARING UNIT ON SHAFT

(71) Applicant: Aktiebolaget SKF, Gothenburg (SE)

(72) Inventors: Yves-André Liverato, Saint Paterne Racan (FR); Olivier Verbe, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/780,125

(22) Filed: Feb. 3, 2020

(65) Prior Publication Data
US 2020/0333373 A1    Oct. 22, 2020

(30) Foreign Application Priority Data

Apr. 16, 2019 (DE) .......................... 102019205463.3

(51) Int. Cl.
| *F16C 41/00* | (2006.01) |
| *G01P 3/44* | (2006.01) |
| *H02K 5/173* | (2006.01) |
| *H02K 7/08* | (2006.01) |
| *H01R 13/66* | (2006.01) |
| *F16C 35/067* | (2006.01) |
| *F16C 35/063* | (2006.01) |

(52) U.S. Cl.
CPC ............ *G01P 3/443* (2013.01); *F16C 35/063* (2013.01); *F16C 35/067* (2013.01); *H01R 13/6683* (2013.01); *H02K 5/1732* (2013.01); *H02K 7/08* (2013.01); *F16C 2380/26* (2013.01)

(58) Field of Classification Search
CPC .......... F16C 19/541–543; F16C 35/063; F16C 35/067; F16C 41/004; F16C 41/007; F16C 43/04; F16C 2380/26; G01P 3/36; G01P 3/443
USPC ..................................................... 73/493, 494
See application file for complete search history.

(56) References Cited

U.S. PATENT DOCUMENTS

| 5,010,290 | A | * | 4/1991 | Foster | F16C 41/04 |
| | | | | | 324/173 |
| 5,310,266 | A | * | 5/1994 | Coux | G01P 3/443 |
| | | | | | 324/207.25 |
| 6,593,733 | B1 | * | 7/2003 | Nicot | F16C 41/04 |
| | | | | | 324/207.25 |
| 7,441,457 | B2 | * | 10/2008 | Jaklin | G01D 11/245 |
| | | | | | 411/908 |
| 7,503,214 | B2 | * | 3/2009 | Machill | G01D 11/245 |
| | | | | | 384/448 |
| 2003/0147572 | A1 | * | 8/2003 | Message | G01P 3/443 |
| | | | | | 384/448 |

(Continued)

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

Sensor bearing unit providing at least two bearings stacked one relative to the other and each having an inner ring and an outer ring, the sensor bearing unit having a sleeve radially surrounding the bearings and having a radial projection in axial contact with one of the bearings, an annular flange having a radial portion in axial contact with the other bearing and an axial portion radially surrounding the sleeve and connected to the sleeve, and a wire carrier configured to support at least one wire and at least one connector, the wire carrier includes at least one fastening element mounted on the bearing.

10 Claims, 9 Drawing Sheets

(56) References Cited

U.S. PATENT DOCUMENTS

| | | | | |
|---|---|---|---|---|
| 2003/0179967 A1* | 9/2003 | Meeker | ............... | G01P 3/443 |
| | | | | 384/448 |
| 2011/0262067 A1* | 10/2011 | Landrieve | ............ | F16C 35/063 |
| | | | | 384/448 |
| 2013/0322800 A1* | 12/2013 | Abgrall | ............... | F16C 41/007 |
| | | | | 384/448 |

* cited by examiner

SENSOR BEARING UNIT, ASSEMBLY METHOD OF SAID UNIT AND METHOD FOR ASSEMBLING SAID SENSOR BEARING UNIT ON SHAFT

CROSS-REFERENCE TO RELATED APPLICATIONS

This application claims priority to German Patent Application no. 102019205463.3, filed Apr. 16, 2019, the contents of which are fully incorporated herein by reference.

FIELD OF THE INVENTION

The present invention relates to the field of rolling bearing, and more particularly to the field of sensor bearing units used in all fiber optical sensing applications for monitoring the status of rotating or linear components. Bearings units may also be used in motor management, steering, speed and position sensing or for measuring angular position.

BACKGROUND OF THE INVENTION

Wire management in sensor bearings is a particularly redundant issue. Indeed, minimum bending radius of the wire must be guaranteed. Furthermore, the wire are often stored along the bearing by creating a strand and are thus exposed to damages. Wire may also be damaged during the assembly process, notably on the shaft of a fiber optical sensing application.

It is known to use strands and twisted bonds. However, such solutions are not satisfying in term of wire protection.

SUMMARY OF THE INVENTION

The aim of the present invention is to provide a sensor bearing unit configured to protect the wire before assembly on an application.

It is a particular object of the present invention to provide a sensor bearing unit, designed to be mounted on an assembly, such as for example a fiber optical sensing application, comprising at least two bearings stacked one relative to the other and each having an inner ring and an outer ring and a sleeve radially surrounding the bearings and having a radial projection in axial contact with one of the bearings.

The sensor bearing unit further comprises an annular flange having a radial portion in axial contact with the other bearing and an axial portion radially surrounding the sleeve and connected to the sleeve.

The annular flange allows avoiding thrust bearing axial movement.

The sensor bearing unit further comprises a wire carrier supporting at least one wire and at least one connector, the wire carrier comprises at least one fastening element mounted on the upper bearing which is in axial contact with the sleeve on the side opposite to the other bearing.

Such sensor bearing unit simplify transport, handling and assembly on a fiber optical sensing application.

The wire are prevented from unwinding and protected from damage until assembly on a shaft of an application.

Thanks to the sleeve, the bearings are prevented from pollution and against shocks.

Furthermore, such sensor bearing unit is capable of guiding the wire without creating a bending radius below a recommended threshold.

Advantageously, the annular flange comprises a radial rib extending radially into a groove provided on the sleeve, for example from an end of the axial portion towards the sleeve and cooperating.

For example, the radial portion of the annular flange extends radially beyond the outer surface of the outer rings of the rolling bearings and beyond the outer surface of the sleeve.

The axial portion of the annular flange may extend axially from the outer end of the radial portion towards the sleeve.

For example, the radial portion has an inner bore for receiving the shaft of the a fiber optical sensing application.

Advantageously, the annular flange is made in two half flanges connected together.

The wire carrier may have a cylindrical hollow body having at least one radial annular protrusion cooperating with the connector support.

The radial annular protrusion has, for example, a dovetail shape in cross-section.

The wire carrier may have two radial annular protrusions, each cooperating with a connector support.

The cylindrical hollow body of the wire carrier may be provided with at least one groove for receiving the wire.

In an embodiment, the wire carrier further comprises a collar extending radially outwardly from the hollow body, for example from a lower end of the hollow body. The collar being provided with the fastening element.

The fastening element comprises, for example, a plurality of clips designed to be clipped on the bore of the outer ring of the bearing.

The clips may be circumferentially spaced apart from each other.

In an alternative, the collar may be provided with a single annular clip.

The wire carrier is connected to the second upper bearing outer ring, supports the wire and the connectors and avoid the wire from bending above a bending radius comprised between 3 mm to 30 mm, for example equal to 10 mm.

The cylindrical hollow body of the wire carrier may extends axially beyond the sleeve.

According to another aspect, the invention provides a method for assembling a sensor bearing unit as described above, comprising the steps of:

assembling at least two bearings, for example using an anti-rotation pin;

mounting the sleeve around the outer rings of the bearings until the radial projection of the sleeve comes in axial contact with a radial face of one of the bearings;

fixing the annular flange, for example with screwing elements, on a lower end of the sleeve, opposite to the end of the sleeve having the radial projection;

At this stage, the rolling bearings are axially maintained in the sleeve and the flange.

The assembly method further comprises the steps of fastening and clipping the wire carrier on the upper rolling bearing and mounting at least one wire and at least one connector on the wire carrier to form the sensor bearing unit.

Thanks to the sensor bearing unit described, wire may be carried with a minimum bending radius and protected during transport before assembly on particular applications, such as fiber optical sensing application.

Wire and connectors may be transported as a unit, without any free cable, since the wire are protected and linked to the bearings.

According to another aspect, the invention provides a method for mounting a sensor bearing unit as described above on an assembly comprising a shaft and a housing, comprising the steps of:

press fitting the sensor bearing unit of the shaft until axial contact between a lower radial surface of the lower bearing and a shoulder of the shaft, for example, by heating the inner rings of the bearings of the sensor bearing unit to a temperature comprised between 100° C. and 120° C., for example equal to 110° C., or by using a press assembly, disconnected the flange, mounting a locking washer and a locking nut on the shaft using a tool for tightening the nut on the upper bearing, mounting a housing around the sleeve and removing the sleeve.

The housing and the sleeve may be provided with indexing marks in order to align correctly those two elements before assembling.

The method further comprises unclipping the connector, unwinding the wire from the wire carrier, and removing the wire carrier.

The locking washer may be bend to maintain the wire.

The bearings and the wire are thus assembled between the shaft and the housing of an assembly.

The assembly of the sensor bearing unit is particularly easy, as well as the assembly of the unit on the shaft of a fiber optical sensing application.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
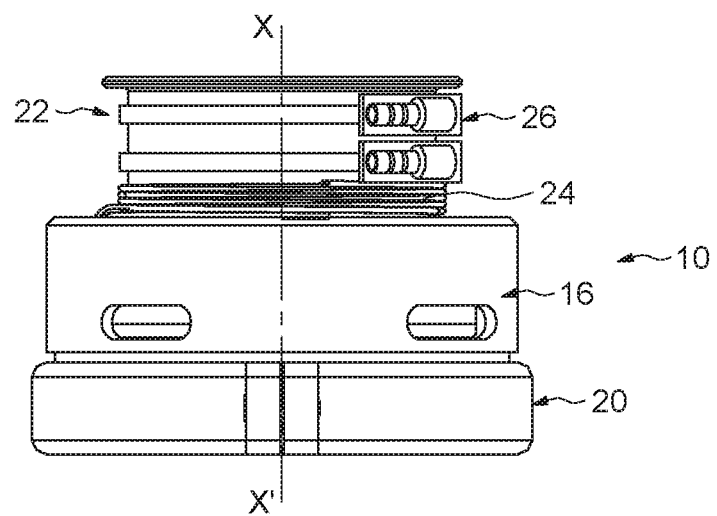
FIG. 1 is a view of a sensor bearing unit according to an embodiment of the invention.

In the further description, terms "outer" and "inner" are defined with respect to the rotational axis X-X' of the rolling bearing illustrated on FIG. 1, where the term "inner" means closer to the rotational axis X-X' of the rolling bearing then term "outer".

Figure 2:
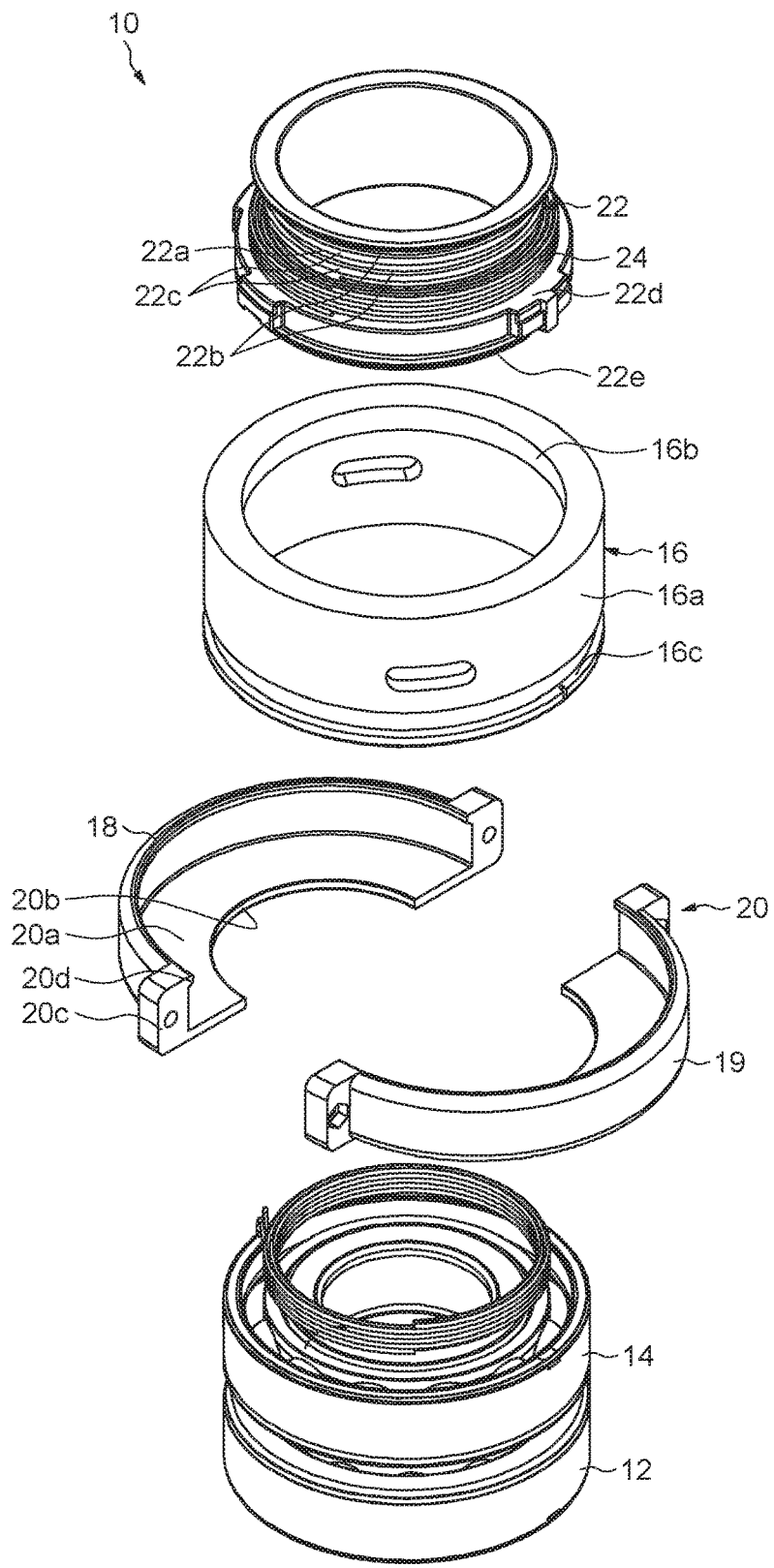
FIG. 2 is a perspective exploded view of the sensor bearing unit of FIG. 1.

Referring first to FIGS. 1 and 2, which illustrates an embodiment of a sensor bearing unit 10 according to the invention designed to be mounted on an assembly, such as for example a fiber optical sensing application.

The sensor bearing unit 10 comprises a first lower bearing 12 and a second upper bearing 14. Each bearing 12, 14, shown in details on FIG. 7, has an inner ring 12a, 14a, an outer ring 12b, 14b, a row of rolling elements 12c, 14c consisting, in the example illustrated, of balls, held by a cage (not shown on the Figures) between the inner ring 12a, 14a and the outer ring 12b, 14b. The bearings 12, 14 may be angular contact ball bearings designed to accommodate combined loads, i.e. simultaneously radial and axial loads.

The first lower bearing 12 and the second upper bearing 14 are in axial contact.

As shown, the first lower bearing 12 and the second upper bearing 14 are disposed face to face. Alternatively, the first lower bearing 12 and the second upper bearing 14 may be disposed back to back.

The inner rings 12a, 14a and the outer rings 12b, 14b are solid and have a toroidal groove (not depicted) provided respectively on their outer cylindrical surface and inner cylindrical surface and forming a raceway for the rolling elements 12c, 14c. The radius of curvature of the groove is slightly greater than the radius of the rolling elements 12c, 14c.

Each ring 12, 14 has a lower radial face and an upper radial face (not referenced) delimiting an axial bore designed to receive a shaft 30 and a circumferential outer surface. As shown on the Figures, the upper radial face of the first lower ring 12 is in axial contact with the lower radial face of the second upper ring 14.

The inner rings 12a, 14a and the outer rings 12b, 14b are made of metallic material.

The inner rings 12a, 14a and the outer rings 12b, 14b may be manufactured by machining or by pressing a steel blank which is then ground and optionally lapped at the raceway in order to give the rings their geometric characteristics and its final surface finish.

The sensor bearing unit 10 further comprises a sleeve 16 having a hollow cylindrical body 16a radially surrounding the two bearings 12, 14 and a radial projection 16b extending towards the inner rings and in axial contact with a radial outer surface of the second bearing 14. The sleeve 16 maintains the two rolling bearings 12, 14 together.

The sensor bearing unit 10 further comprises a flange 20 split into two half flanges 18, 19 fixed together for example with screwing elements.

Figure 6:
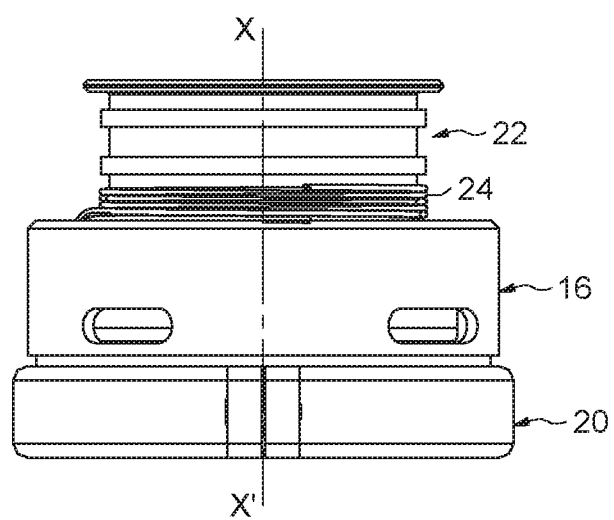
FIG. 6 is a cross section of the sensor bearing unit of FIG. 1 assembled on a shaft of an assembly after a first assembly step.

Once connected, the two half flanges 18, 19 form the circular flange 20 having a radial portion 20a in axial contact with the lower radial face of the first lower rolling bearing 12 axially on the side opposite to the second rolling bearing 14. The flange 20 has an inner bore 20b for receiving the shaft 30 of the a fiber optical sensing application, as shown in FIG. 6. The radial portion 20a extends radially beyond the outer surface of the outer rings of the rolling bearings 12, 14 and beyond the outer surface of the sleeve 16.

The flange 20 further comprises an axial portion 20c extending from the outer end of the radial portion 20a towards the sleeve 16. The axial portion 20c is provided with a radial rib 20d extending radially towards the sleeve 16 and inserted in a corresponding groove 16c provided on the sleeve 16. The half flanges 18, 19 allow avoiding thrust bearing axial movement.

The sensor bearing unit 10 further comprises a wire carrier 22 having a cylindrical hollow body 22a having a plurality of grooves 22b provided on its cylindrical outer surface (not referenced) for receiving wire 24. Two radial annular protrusions 22c are provided respectively between two adjacent grooves 22b. As shown on FIG. 6, each radial annular protrusion 22c has a dovetail shape in cross-section. Each radial annular protrusion 22c is configured to cooperate with a connector support 26. The connector support 26 thus comprises a groove (not referenced) having a shape in cross-section matching the shape of the annular protrusion 22c. The cylindrical hollow body 22a of the wire carrier 22 extends axially beyond the sleeve 16.

The wire carrier 22 further comprises a collar 22d extending radially outwardly from a lower end of the hollow body 22a. The collar 22d is in axial contact against the upper radial face of the second upper ring 14 on the side opposite to the first lower bearing 12. The collar 22d is further provided with a plurality of clips 22e designed to be clipped on the bore of the outer ring 14b of the second rolling bearing 14. The bore of the outer ring 14b is thus provided with a groove inside which the clips 22e are clipped. The clips 22e are circumferentially spaced apart from each other. In an alternative, the collar may be provided with a single annular clip.

The wire carrier 22 is connected to the second upper bearing 14 outer ring 14b, supports the wire 24 and the connectors 26 and avoid the wire from bending above a bending radius comprised between 3 mm to 30 mm, for example equal to 10 mm.

Figure 3:
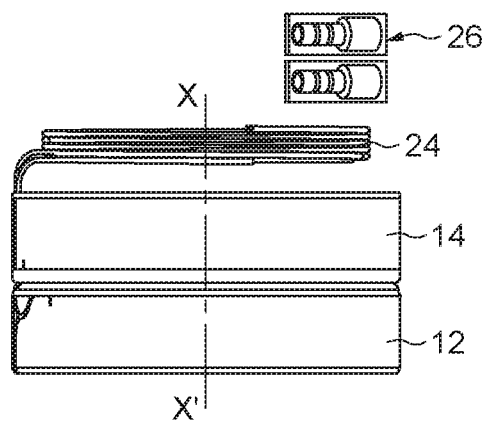
FIGS. 3 to 5 illustrate assembly steps of the sensor bearing unit of FIG. 1.
Figure 4:
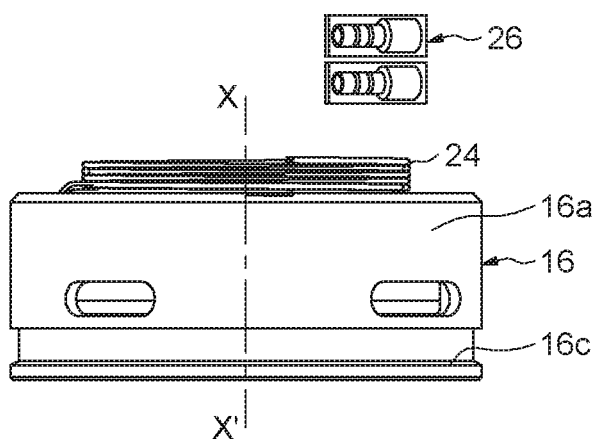
Figure 5:
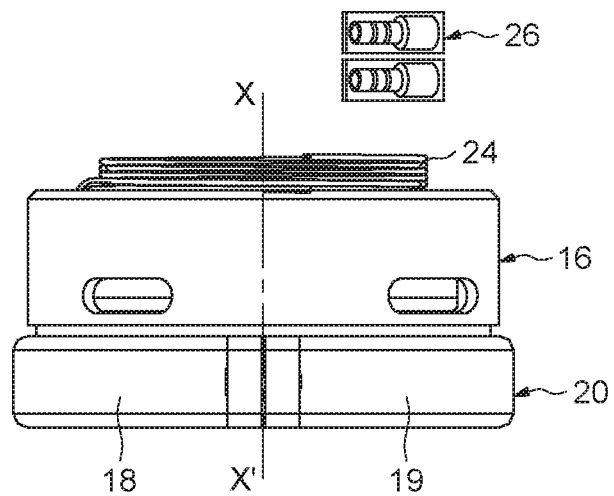

The sensor bearing unit 10 is assembled as followed in reference to FIGS. 3 to 5.

In a first step, shown in FIG. 3, the two rolling bearings 12, 14 are assembled, for example using an anti-rotation pin (not shown).

The sleeve 16 is then mounted on the outer rings 12b, 14b of the rolling bearings 12, 14 until the radial projection 16b of the sleeve 16 comes in axial contact with a radial outer surface of the second bearing 14 as shown in FIG. 4.

At a further step, shown in FIG. 5, the two half flanges 18, 19 are fixed together, for example with screwing elements, to form a circular flange 20 fixed on a lower end of the sleeve 16, opposite to the end of the sleeve having the radial projection 16b.

At this stage, the rolling bearings 12, 14 are axially maintained in the sleeve 16 and the half flanges 18, 19.

The wire carrier 22 is then mounted and clipped on the inner surface of the outer ring 14b of the second rolling bearing 14.

Wire 24 and connectors 26 are then mounted on the wire carrier 22 to form the sensor bearing unit 10 of FIG. 1.

Thanks to the sensor bearing unit described, wire may be carried with a minimum bending radius and protected during transport before assembly on particular applications, such as fiber optical sensing application.

Wire and connectors may be transported as a unit, without any free cable, since the wire are protected and linked to the bearings.

The sensor bearing unit 10 is assembled on a shaft 30 of an assembly as followed in reference to FIGS. 6 to 10.

When assembling the sensor bearing unit 10 of FIG. 1 on a shaft 30, the inner rings 12a, 14a of the bearings 12, 14 of the sensor bearing unit 10 are first heated to a temperature comprised between 100° C. and 120° C., for example equal to 110° C., and then press fitted on the shaft 30 until axial contact between a lower radial surface of the lower first bearing 12 and a shoulder 30a of the shaft 30.

Alternatively, a press assembly may be used to press fit the sensor bearing unit 10 of the shaft 30.

Figure 7:
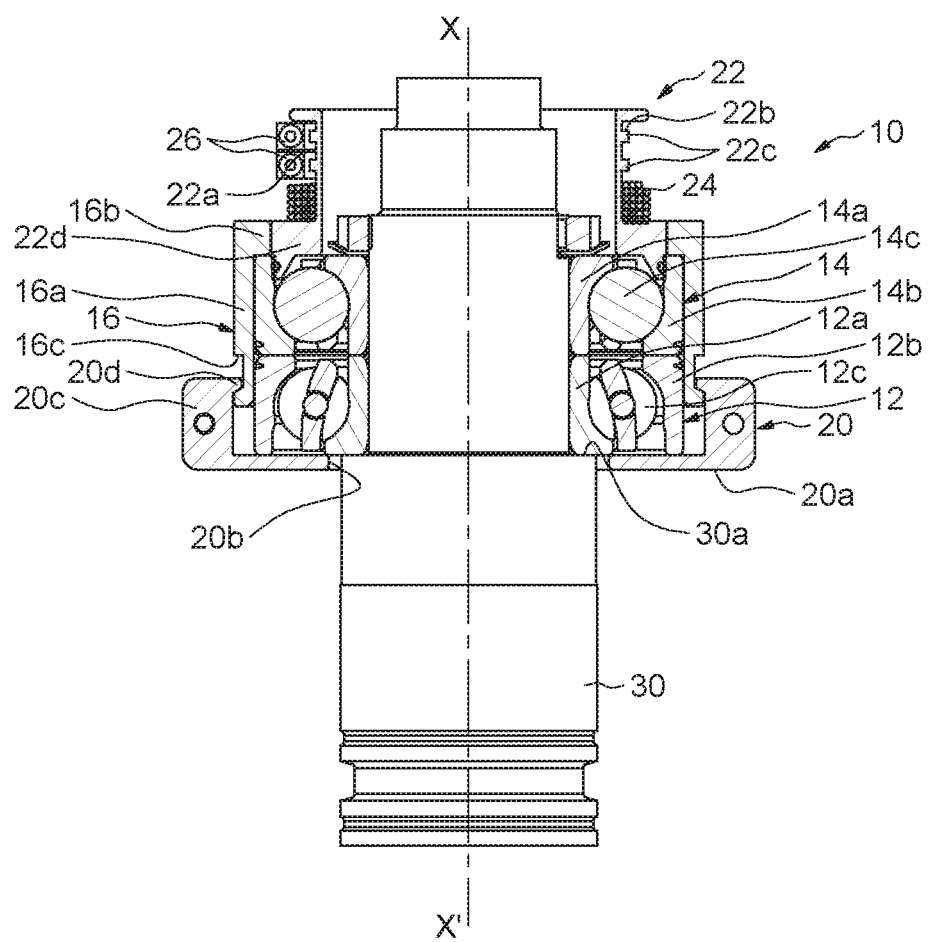
FIGS. 7 to 10 illustrate further assembly steps of the sensor bearing unit of FIG. 1 the sensor bearing unit of FIG. 1 on a shaft of an assembly.
Figure 8:
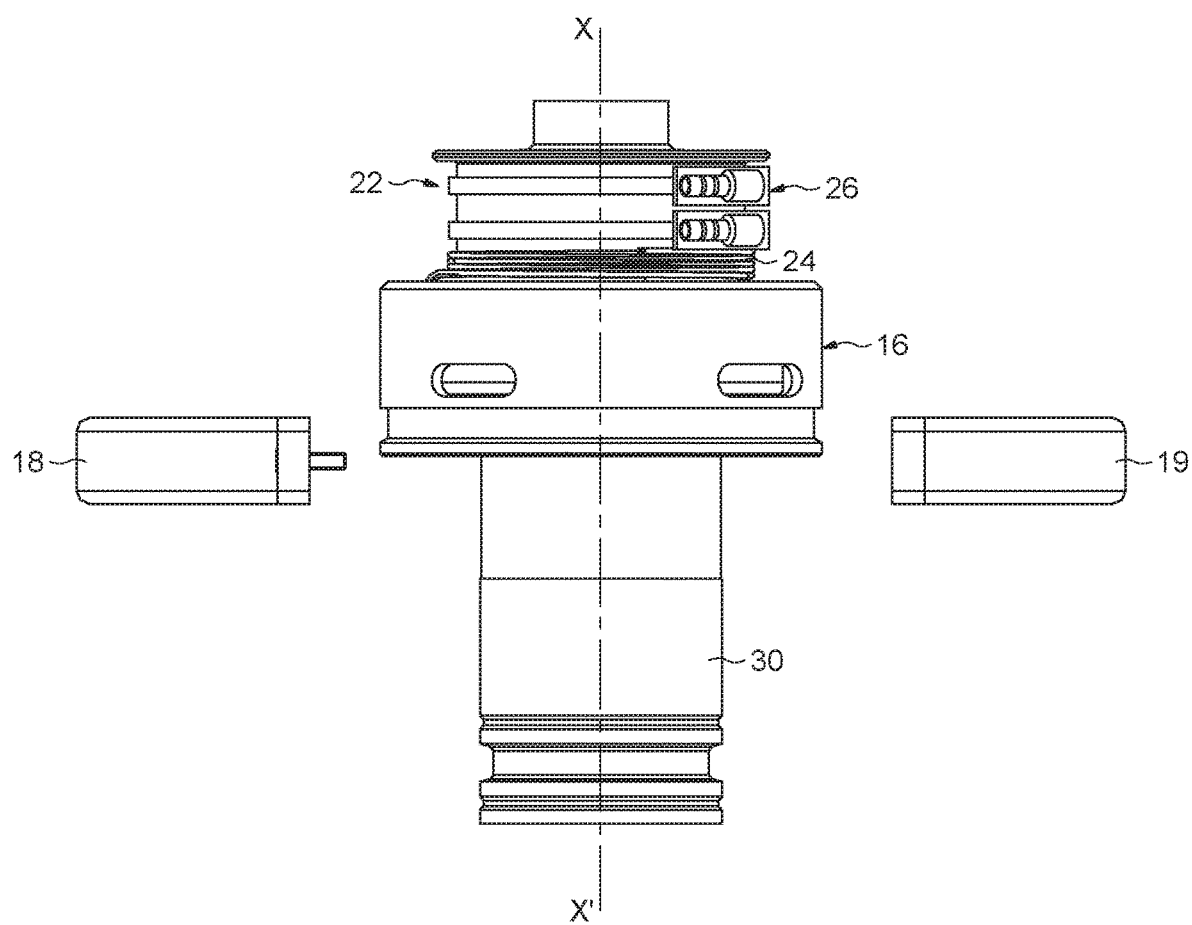
Figure 9:
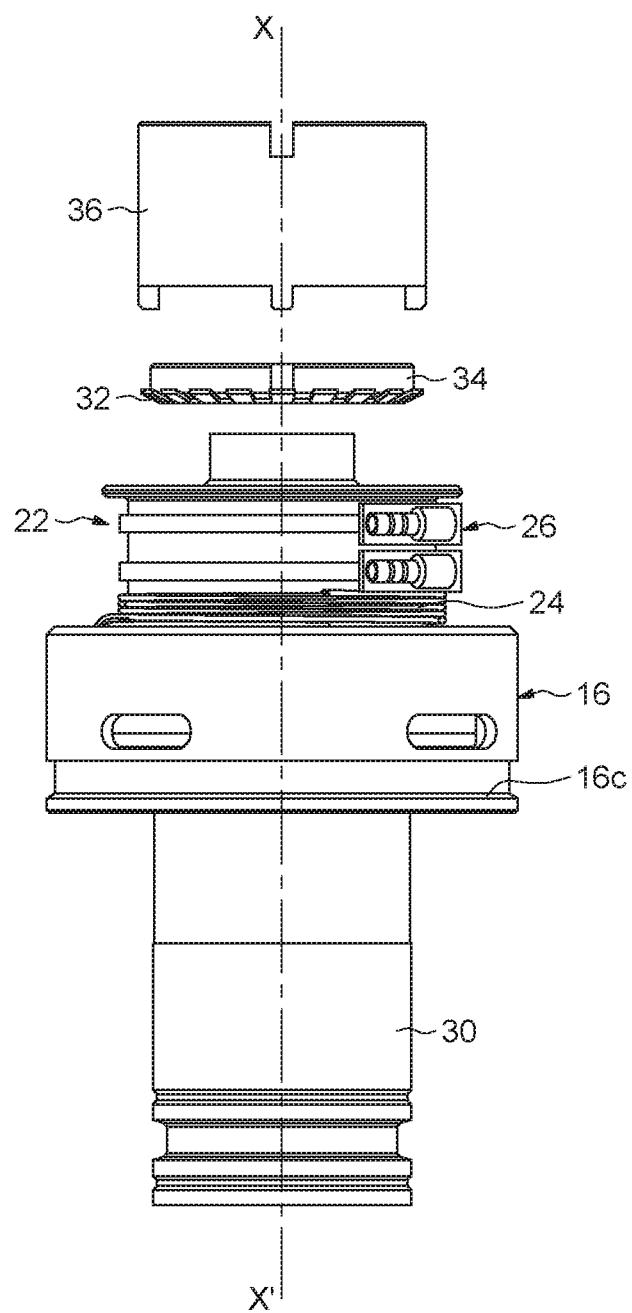

The half flanges 18, 19 is then disconnected, as shown on FIG. 7.

At a further step, a locking washer 32 and a locking nut 34 are mounted on the shaft 30 using a tool 36 for tightening the nut 34 against the inner ring 14a of the upper second bearing 14.

Figure 10:
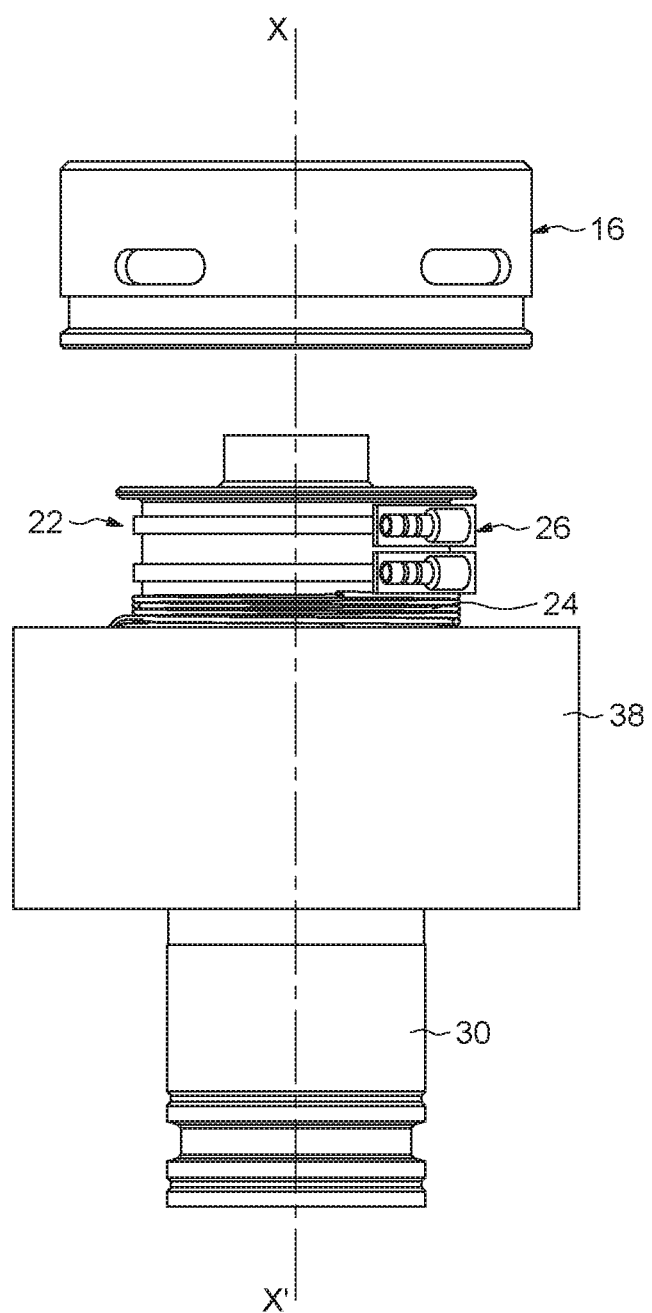

The subsystem is then mounted in a housing 38, for example a pump housing, so that the sleeve 16 is located inside the housing 38, as shown in FIG. 10, and the sleeve 16 is removed.

While entering the sub-system in the housing 38, the sleeve 16 is pushed out gradually vertically to the top to be removed. The wire 24 are maintained in the bearings groove (not referenced in the Figures as they are maintained by the sleeve 16 and then by the housing 38.

The housing 38 and the sleeve 16 may be provided with indexing marks (not shown) in order to align correctly those two elements before assembling.

At this stage, the wire 24 and the connectors 26 are still on their carrier 22.

The connectors 26 are unclipped from the wire carrier 22, the wire 24 are then unwound and the wire carrier 22 is removed. At this stage, the wire 24 pass through the housing 38 in a hole (not shown).

Figure 11:
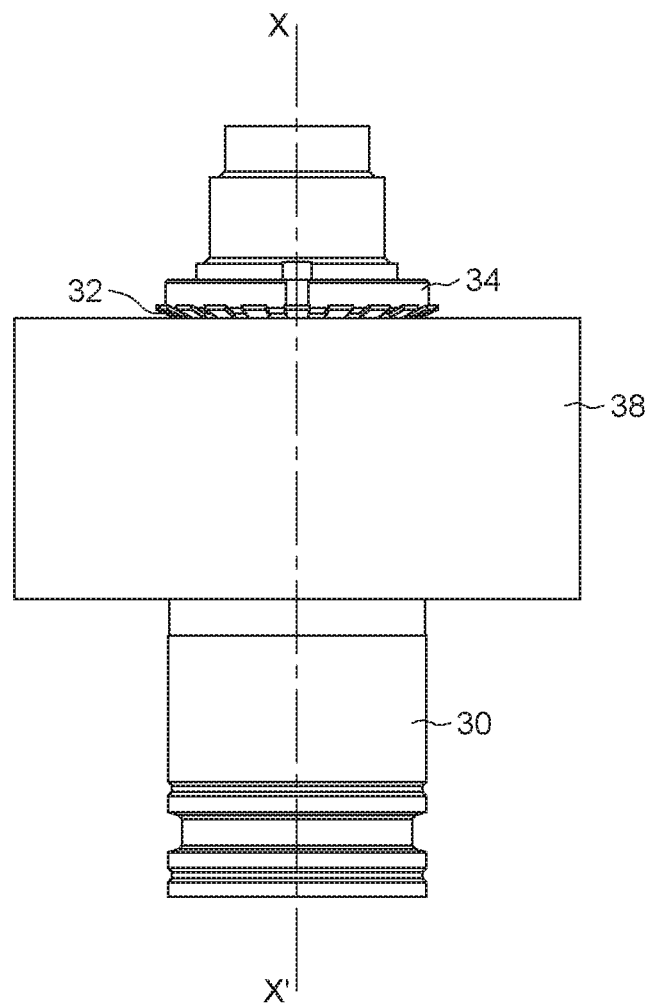
FIG. 11 is a perspective view of the final assembly of the sensor bearing unit of FIG. 1.

Finally, FIG. 11 shows the locking washer 32 being bent to maintain the wire 24.

The rolling bearings 12, 14 and the wire 24 are thus assembled between the shaft 30 and the housing 38 of an assembly.

The assembly of the sensor bearing unit is particularly easy, as well as the assembly of the unit on the shaft of a fiber optical sensing application.

The invention claimed is:

1. A sensor bearing unit comprising:
a first bearing having a first inner ring and a first outer ring;
a second bearing adjacently positioned to the first bearing in an axially aligned manner, the second bearing ring having a second inner ring and a second outer ring,
a sleeve radially surrounding the first bearing and the second bearing and having a radial projection in axial contact with the first bearing,
an annular flange having a radial portion in axial contact with the second bearing and an axial portion radially surrounding the sleeve and connected to the sleeve, and
a wire carrier supporting at least one wire and at least one connector, wherein
the wire carrier comprises at least one fastening element mounted on the first bearing.

2. The sensor bearing unit according to claim 1, wherein the annular flange comprises a radial rib extending radially into a groove provided on the sleeve.

3. The sensor bearing unit according to claim 1, wherein the radial portion of the annular flange extends radially beyond the outer surface of the first outer ring and the second outer ring and beyond an outer surface of the sleeve.

4. The sensor bearing unit according to claim 1, wherein the axial portion of the annular flange extends axially from the outer end of the radial portion of the annular flange towards the sleeve.

5. The sensor bearing unit according to claim 1, wherein the annular flange comprises two half flanges connected together.

6. The sensor bearing unit according to claim 1, wherein the wire carrier has a cylindrical hollow body having at least one radial annular protrusion cooperating with the connector support.

7. The sensor bearing unit according to claim 6, wherein the wire carrier further comprises a collar extending radially outwardly from the hollow body, the collar being provided with a fastening element.

8. The sensor bearing unit according to claim 7, wherein the fastening element comprises a plurality of clips designed to be clipped on the inner surface of the first outer ring.

9. A method for assembling a sensor bearing unit comprising:
a first bearing having a first inner ring and a first outer ring a second bearing having a second inner ring and a second outer ring, a sleeve radially surrounding the first bearing and the second bearing and having a radial projection in axial contact with the first bearing, an annular flange having a radial portion in axial contact with the second bearing and an axial portion radially surrounding the sleeve and connected to the sleeve, and a wire carrier supporting at least one fastening element mounted on the first bearing, the method further comprising the steps of:

assembling the first bearing and the second bearing;

mounting the sleeve around the first outer ring and the second outer ring until the radial projection of the sleeve comes in axial contact with a radial face of the first bearing;

fixing the annular flange on a lower end of the sleeve, opposite to the end of the sleeve having the radial projection;

fastening the wire carrier on the first bearing, mounting at least one wire and at least one connector on the wire carrier.

10. A method for assembling a sensor bearing unit assembly comprising:
a first bearing having a first inner ring and a first outer ring,
a second bearing having a second inner ring and a second outer ring,
a sleeve radially surrounding the first bearing and the second bearing and having a radial projection in axial contact with the first bearing, an annular flange having a radial portion in axial contact with the second bearing and an axial portion radially surrounding the sleeve and connected to the sleeve, and providing a wire carrier supporting at least one wire and at least one connector, wherein the wire carrier comprises at least one fastening element mounted on the first bearing, providing a shaft and a housing, and further comprising the steps of:

press fitting the sensor bearing unit on the shaft until axial contact between a lower radial surface of the second bearing and a shoulder of the shaft;

disconnecting the flange;

mounting a locking washer and a locking nut on the shaft using a tool for tightening the nut against the first bearing;

mounting a housing around the sleeve;

removing the sleeve;

unclipping the connector and unwinding the wire from the wire carrier; and removing the wire carrier.

* * * * *